United States Patent
Isensee et al.

(10) Patent No.: US 6,823,344 B1
(45) Date of Patent: Nov. 23, 2004

(54) FILE MANAGER SYSTEM PROVIDING FASTER AND MORE EFFICIENT INTERACTIVE USER ACCESS TO FILES IN COMPUTER DISPLAYS

(75) Inventors: Scott Harlan Isensee, Georgetown, TX (US); Ricky Lee Poston, Austin, TX (US); I-Hsing Tsao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 09/204,914

(22) Filed: Dec. 3, 1998

(51) Int. Cl.[7] .......................... G06F 17/00; G06F 17/30
(52) U.S. Cl. ........................ 707/104.1; 707/2; 345/811
(58) Field of Search .............................. 707/104, 1, 2, 707/104.1; 345/326, 348, 700, 764, 781, 810, 811

(56) References Cited

U.S. PATENT DOCUMENTS

| | | | | |
|---|---|---|---|---|
| 5,726,688 A | * | 3/1998 | Siefert et al. ............... | 345/352 |
| 6,119,186 A | * | 9/2000 | Watts et al. ................. | 710/104 |
| 6,121,968 A | * | 9/2000 | Arcuri et al. ................ | 345/352 |
| 6,144,379 A | * | 11/2000 | Bertram et al. ............. | 345/348 |
| 6,148,294 A | * | 11/2000 | Beyda et al. .................. | 707/1 |

* cited by examiner

Primary Examiner—Uyen Le
(74) Attorney, Agent, or Firm—Jerry B. Kraft; Leslie Wan Leeuwen; Richard A. Henkler

(57) ABSTRACT

A computer controlled user interactive display system having the customary provision of user access to the files stored therein through the display of a plurality of interactive objects which may be icons or even text representing the files usually in an arrangement of hierarchical screens. In addition, the system has means for displaying a set of high interactivity objects separate from the display of the plurality of objects. This set of high activity objects is developed through means for monitoring user interactivity with respect to basic plurality of interactive objects and means responsive to the monitoring means for selecting a set of high interactivity objects having user interactivity greater than selected levels. The system further includes means for displaying the set of high interactivity objects responsive to any file request so that the high interactivity objects are immediately displayed in response to any file request.

21 Claims, 7 Drawing Sheets

FILE MANAGER SYSTEM PROVIDING FASTER AND MORE EFFICIENT INTERACTIVE USER ACCESS TO FILES IN COMPUTER DISPLAYS

TECHNICAL FIELD

The present invention relates to the accessing of files in interactive computer controlled display system operations.

BACKGROUND OF THE INVENTION

The 1990's decade has been marked by a technological revolution driven by the convergence of the data processing industry, the communications industry and the consumer electronics industry. This advance has been even further accelerated by the extensive consumer and business involvement in the Internet over the past few years. It seems as if virtually all aspects of human endeavor in the industrialized world will potentially involve human-computer interfaces; especially such interfaces to communication networks as the Internet. As a result of these profound changes, there is a need to make computer directed activities accessible to a great many people who had been computer illiterate or, at best, computer indifferent.

One function which developers of display interfaces have been addressing is ease of use in the interactive user handling of data files. No matter how intuitive and easy to use an interface may be in its use of icons related to three-dimensional real life to make even the novice user feel at home with the interface, in most human/computer transactions a point is reached when the user must relate to computer files. The ease of use facility relative to file handling has certainly improved with the advances in the use of displayed file icons and a variety of "drag and drop" expedients which facilitate the interactive user moving of documents between files, merging of files, shifting of files between directories as well as creating and erasing files. However, the increased usage of the computer as described above has increased the demand for interactive file handling to more than offset these small gains. Since the file is the basic unit of storage that enables the computer to distinguish between sets of data, there are up to thousands of files in a computer operation. Depending on the type of file, the user has greater or lesser control as to the frequency with which he needs to interactively access the file during computer usage.

Perhaps, with the exception of accessing document files in conventional word processing applications, accessing of computer files during operations still remains one of the more complex interactive tasks which the less sophisticated computer user regularly encounters. Even in user friendly graphical user interface systems which extensively use icons, the user often has to wade through several hierarchical layers of directories, subdirectories and files in order to access particular files.

SUMMARY OF THE INVENTION

The present invention provides a solution to the above problems by providing a computer controlled user interactive display system having the customary provision of user access to the files stored therein through the display of a plurality of interactive objects which may be icons or even text representing the files usually in an arrangement of hierarchical screens. However, in addition, the system has means for displaying a set of high interactivity objects separate from the display of the plurality of objects. This set of high activity objects is developed through means for monitoring user interactivity with respect to the basic plurality of interactive objects and means responsive to the monitoring means for selecting a set of high interactivity objects having user interactivity greater than selected levels. The system further includes means for displaying the set of high interactivity objects responsive to any file request so that the high interactivity objects are immediately displayed in response to any file request. In this manner, the user is presented with a much smaller number of file objects than conventional representing that he is more likely to use based upon past activity.

Preferably, user interactive input is provided to enable the user to select the levels of interactivity which will determine which objects will be in said high interactivity set. In accordance with a supplementary aspect of the present invention, means are provided for removing objects from said high interactivity object set if the interactivity of said objects becomes less than said selected levels.

Since directories and subdirectories may be considered as files, the present invention could, under appropriate circumstances, be set to operate at any directory or subdirectory level in the file hierarchy. In such a case, for example at the directory level, then the means for monitoring the interactive objects would monitor the interactivity of objects, each respectively representing a directory group of files and the selected levels of interactivity would be the interactivity levels of such objects representing directory groups of files. In such a case, the objects representing directory groups of files would provide the set of high interactivity objects.

DETAILED DESCRIPTION OF THE PREFERRED EMBODIMENT

Figure 1:
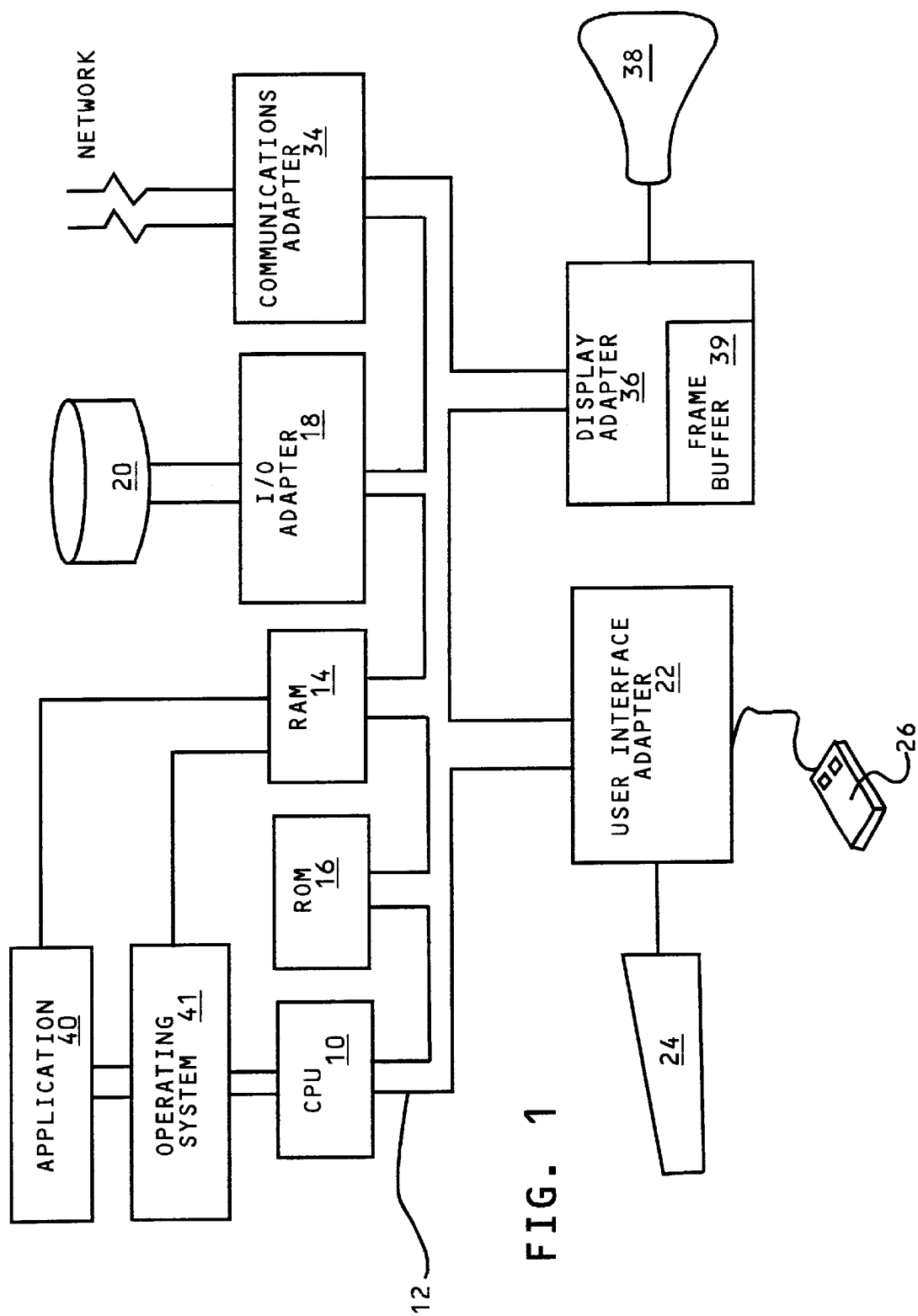
FIG. 1 is a block diagram of a data processing system including a central processing unit which is capable of implementing the user interactive display for the file management system of the present invention.

Referring to FIG. 1, a typical data processing system is shown which may function as the local computer controlled display terminal used in implementing the system of the present invention by presenting to the user a file management system which monitors file access activities and presents the user accessing files with a screen panel of high interactivity objects representative of files with high user access activity. A central processing unit (CPU) 10, such as one of the PC microprocessors available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the OS/2$^{(TM)}$ operating system available from IBM (OS/2 is a trademark of International Business Machines Corporation); Microsoft's Windows 95$^{(TM)}$ or Windows NT$^{(TM)}$, as well as UNIX or AIX operating systems. Most conventional operating systems, like the types mentioned, have icons representative of the managed files arranged in hierarchical level structure. For purposes of illustrating the present invention, we will use the Windows 95 file management hierarchy. A program for developing and presenting a front screen panel of high interactivity objects representing high interactivity files, application 40, to be subsequently described in detail, runs in conjunction with operating system 41 and provides output calls to the operating system 41 which implement the various functions to be performed by the application 40. It should be noted that the application functions may be performed as an application separate from the operating system or the functions may be incorporated directly into the operating system.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of which the memory pages are being managed by the present invention. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

There will now be described a simple illustration of the present invention with respect to the display screens of FIGS. 2 through 6. When the screen images are described, it will be understood that these may be rendered by storing image and text creation programs, such as those in any conventional window operating system in RAM 14 of the system of FIG. 1. The operating system is diagrammatically shown in FIG. 1 as operating system 41. The display screens of FIGS. 2 through 6 are presented to the viewer on display monitor 38 of FIG. 1. In accordance with conventional techniques, the user may control the screen interactively through a conventional I/O device such as mouse 26, FIG. 1, which operates through user interface 22 to call upon programs in RAM 14 cooperating with the operating system 41 to create the images in frame buffer 39 of display adapter 36 to control the display on monitor 38.

Figure 2:
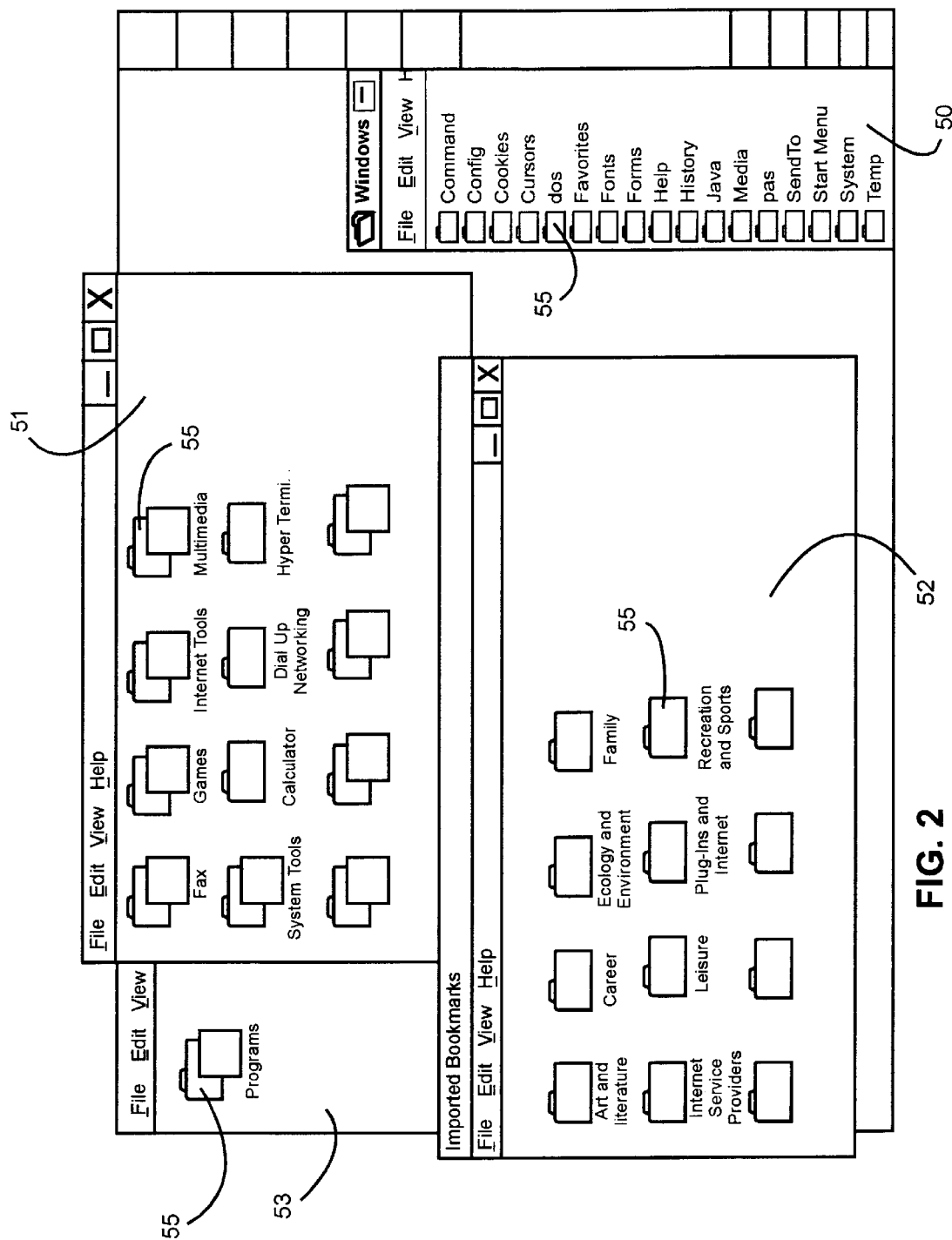
FIG. 2 is a diagrammatic view of a display screen on which an interface to a conventional file management system is presented through which files may be accessed conventionally.
Figure 3:
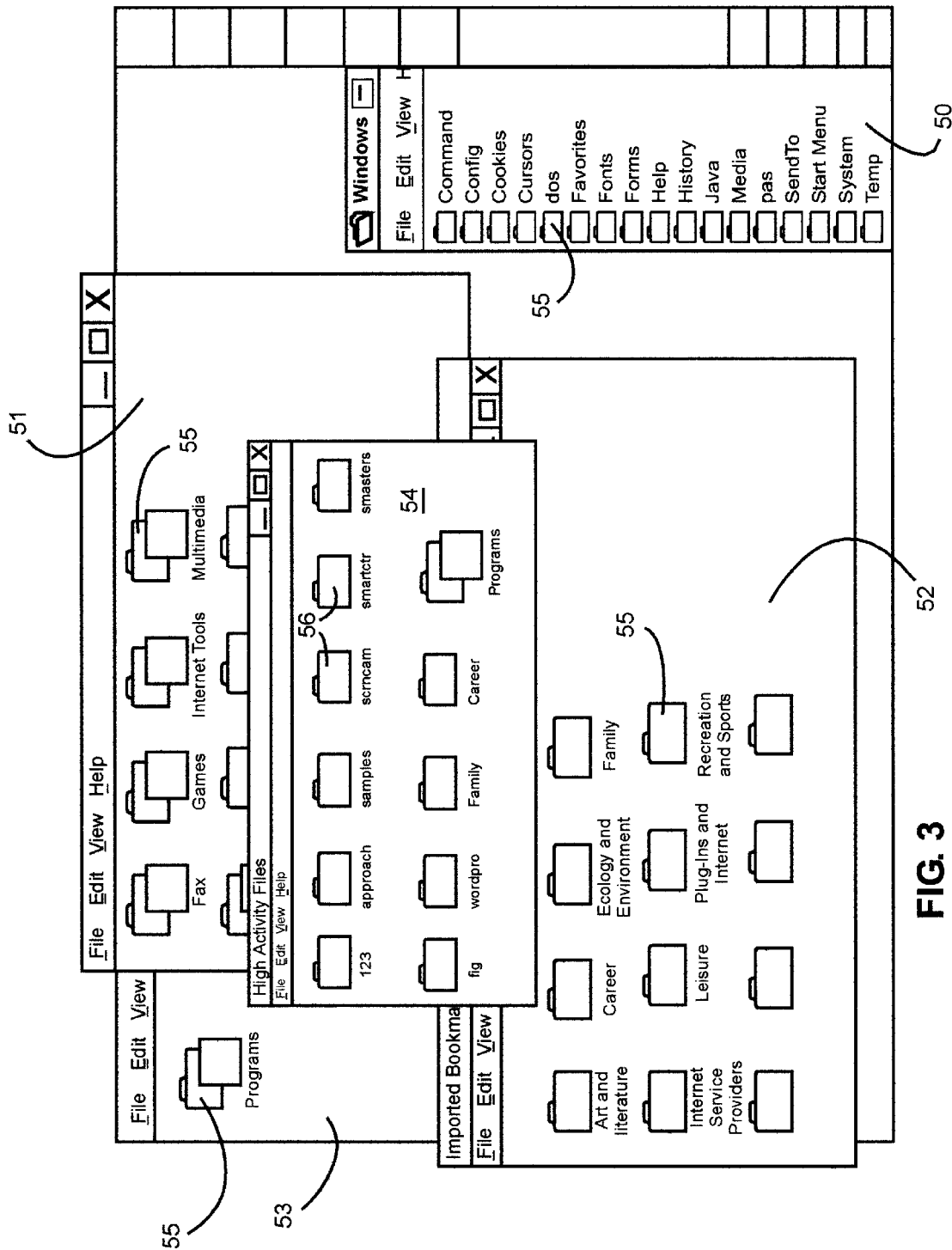
FIG. 3 is the display screen view of FIG. 2 but having superimposed thereon the initial screen panel containing the set of high interactivity objects in accordance with the present invention.
Figure 6:
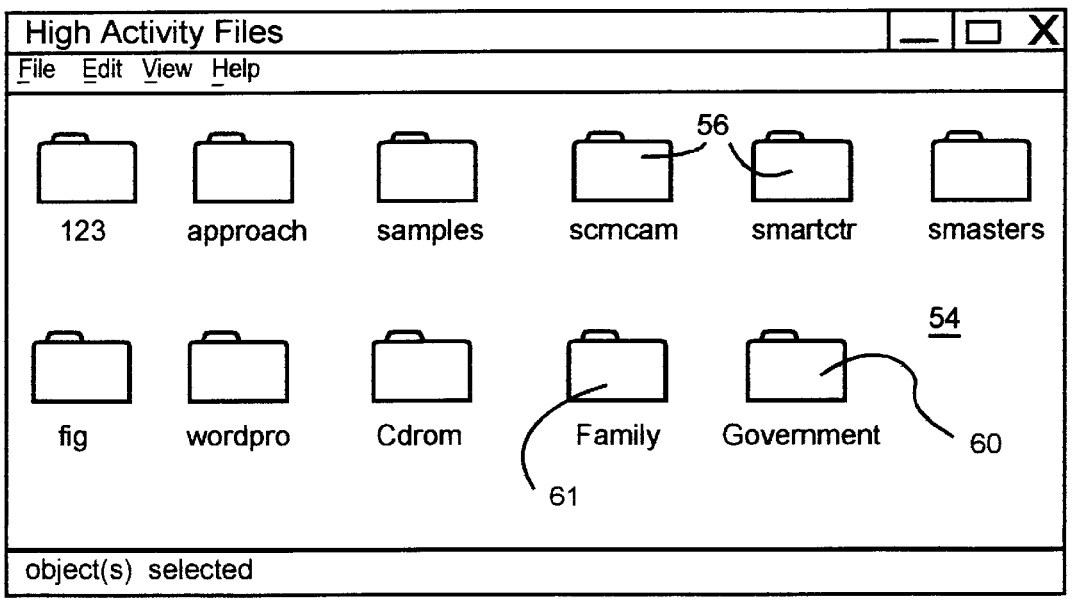
FIG. 6 is a screen panel like that of FIG. 5 but after some high activity objects have been removed and some others added.

The initial display screen of FIG. 2 shows a display screen typical of the overlapping levels of file object windows which a user may have to go through to, let us say, Windows 95 file manager in searching for and trying to access a particular file. There are objects or icons 55 representative of files respectively at levels 50, 51, 52 and 55. In an average Windows 95 operating system managed file hierarchy, the user may be able to access up to thousands of such files at various file, directory and subdirectory levels. Now with respect to FIG. 3, the window 54 containing the set of high interactivity icons 56 representative of the files having high interactivity above user set levels. As will be hereinafter described in greater detail, the activity of files, e.g. level of calls for or hits within a set time period, is tracked and the most active files are selected and their icons 56 are included in the set in high interactivity window 54. The value of the window is based upon the presumption of the continuous need for particular files. The high activity files are the ones most likely to be needed, and those are presented up front so that the user need not use up time looking for them. In the embodiment of FIG. 3, it would appear that the high interactivity set of file icons 56 was brought up after the user had already been searching in the file system. For best results, the high interactivity icon 56 set in window 54 could be brought up as soon as the user gives an indication to the operating file manager than he is trying to access a file. This would result in window 54, FIG. 5, which would come up as soon as the user called a file manager routine. Then, if the file which the user were seeking was in the window set, the user would have the file immediately. On the other hand, if the file were not in the window, the user could cancel the window and the system would return to the regular file manager from which the user could routinely get his file. The system would keep track of this routine access of the particular file, and if the file were accessed often enough, it would be added to the set of high interactivity file objects 56 in window 54. In this respect, FIG. 6 shows the window of FIG. 5 after the interactivity of file objects, i.e. objects representative of a file, have been monitored for interactivity over a user selected time period. Object files 57, 58 and 59, initially in the window in FIG. 5, have been removed from the window in FIG. 6 for insufficient interactivity, while object files 60 and 61 have been added to the window presumably because of their monitored high interactivity.

Figure 4:
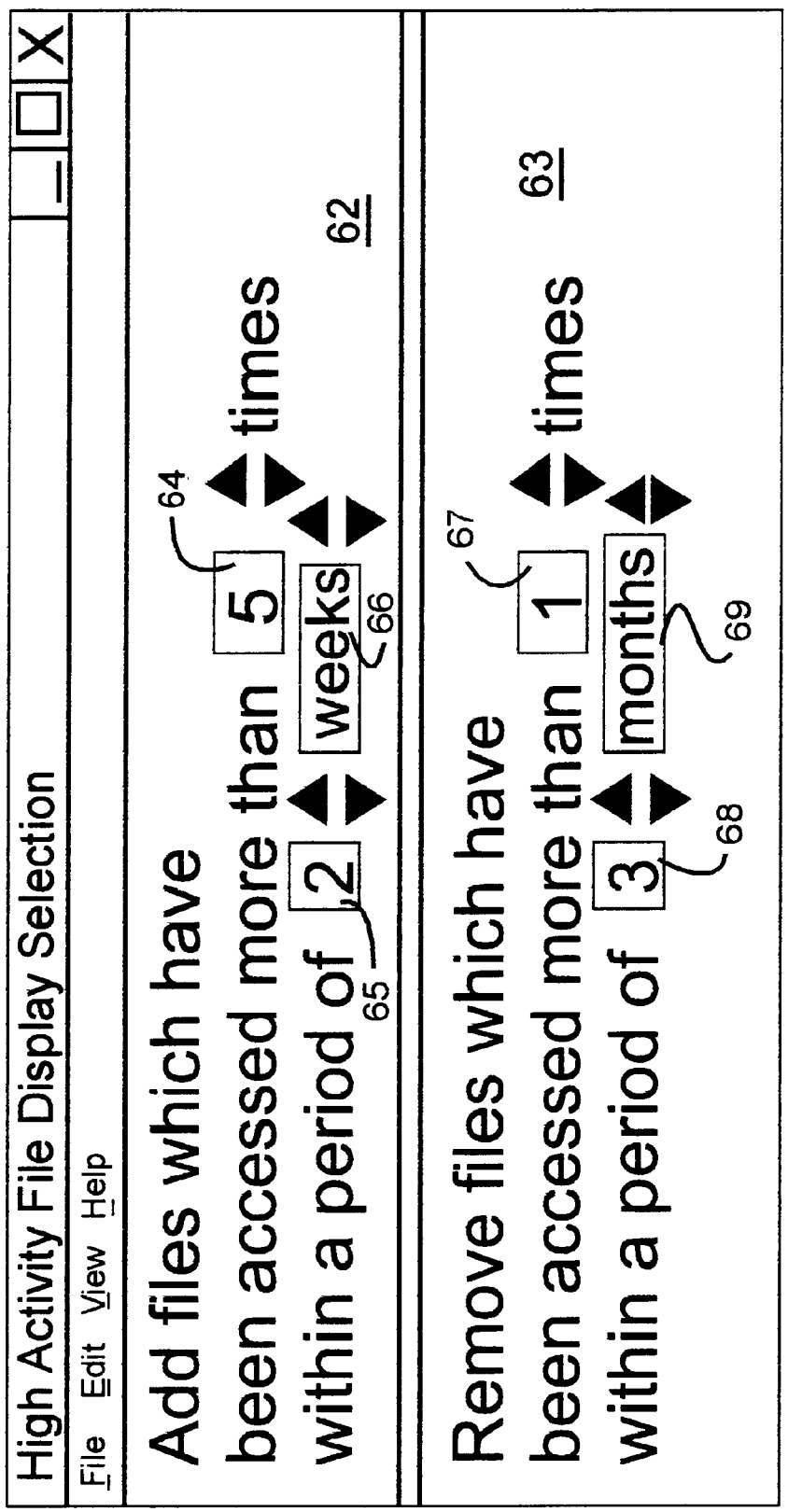
FIG. 4 is a diagrammatic view of an interactive display screen panel through which a user may set interactivity levels determinative of the set of high interactivity objects to be displayed.
Figure 5:
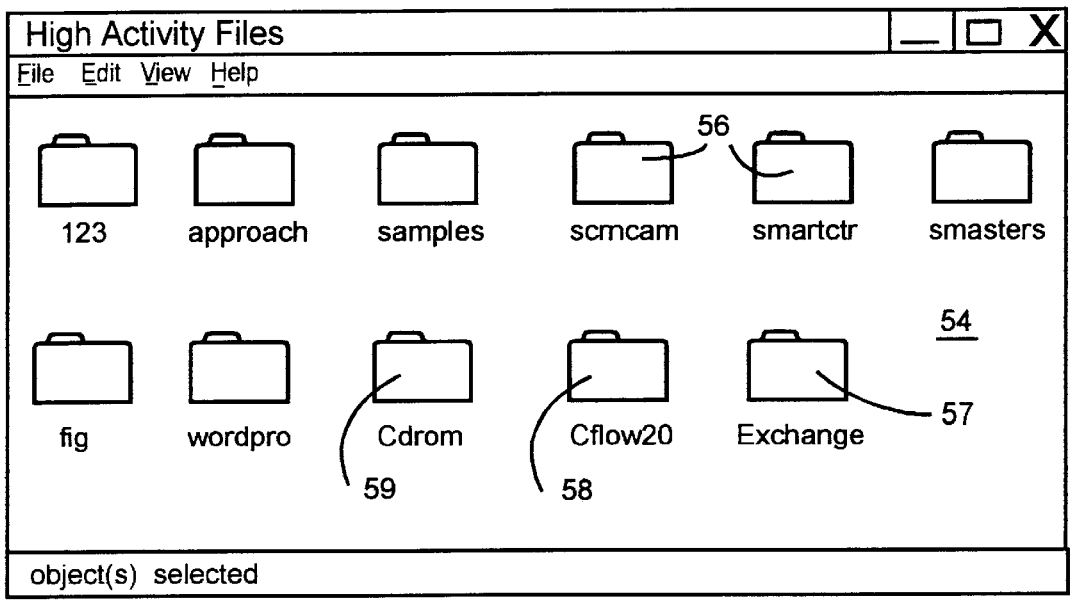
FIG. 5 is the screen panel containing the same set of high activity objects as the panel of FIG. 3 but displayed alone.

The user selects interactivity levels which the high interactivity file objects must maintain in order to be in the set of high interactivity objects. FIG. 4 shows a typical dialog screen panel which may be presented to a user to enable him to set interactivity levels to entitle file objects to be included in the set as shown in window 62 or then be removed from the set as shown in window 63. The frequency of file object access may be interactively set in scrollable viewport 64 over a set time period as input through scrollable viewports 65 and 66. The limits for removing file objects is set up through minimum required access, scrollable viewport 67 over a set time period as input through scrollable viewports 68 and 69.

Figure 7:
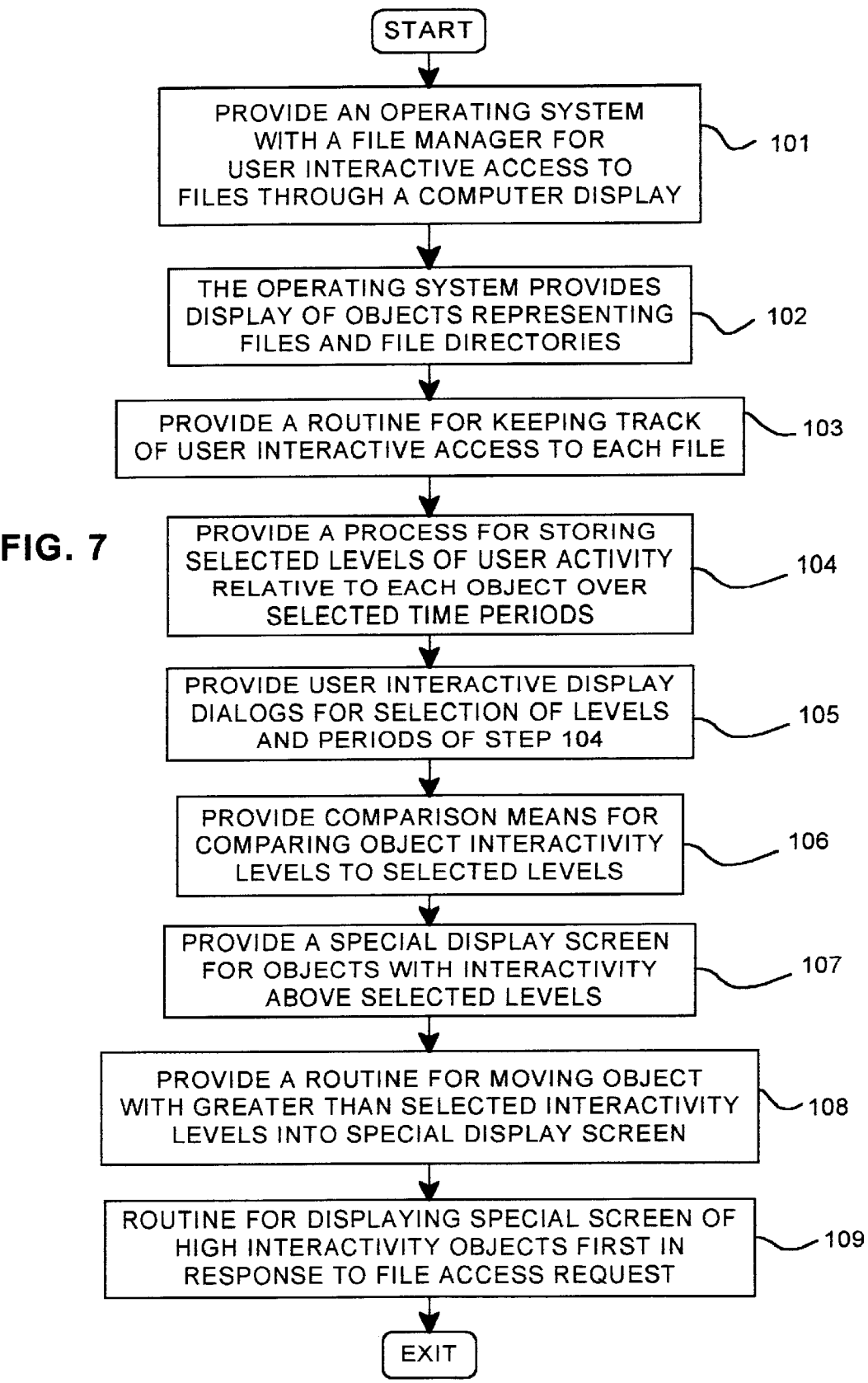
FIG. 7 is a flowchart of the basic elements of the system and program in a computer controlled display system for creating and using the file management system of the present invention involving the display of a selected set of high interactivity objects representative of files.
Figure 8:
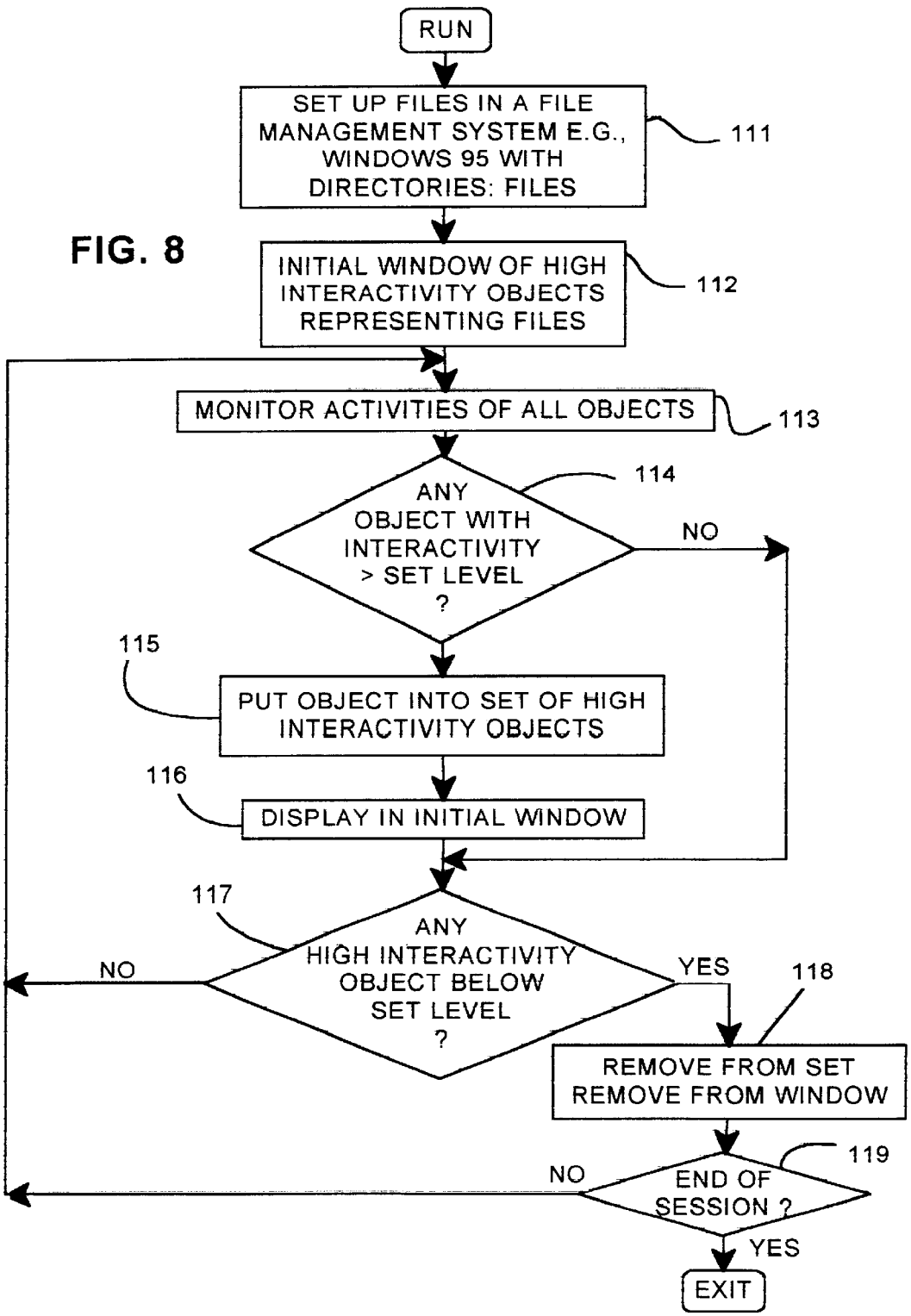
FIG. 8 is a flowchart of the steps involved in running the program set up in FIG. 7 for the initial display and maintenance of a set high interactivity objects.

Now with reference to FIGS. 7 and 8, we will describe a process implemented by the present invention in conjunction with the flowcharts of these figures. The steps in FIG. 7 relate to the development of the process for setting up of the initial window containing the set of high interactivity file objects while the steps in FIG. 8 cover an illustrative run of the process. Referring to FIG. 7, an operating system is provided for a computer display with a conventional file manager for accessing files, e.g. Windows 95 file manager, step 101. Such a file managed operating system displays file objects representative of files, as well as directories and subdirectories, step 102. A routine is provided for keeping track of the user access to each file, step 103. Here, the system of the present invention may afford some flexibility. As there may be many files which in particular computer systems would never be of sufficient user interest or need to be tracked, the system may be set up so that these files are never tracked. Also, for certain needs, and particularly in complex systems of many hierarchical stages or levels of files, it may be desired to only track files at particular hierarchical stages or at the directory or subdirectory stages. A process is provided for storing selected levels of user interactivity relative to each file object being monitored over a selected time period, step 104, and user interactive dialog display panels, FIG. 4, are provided for the selection of such levels and time periods, step 105. Comparison means are provided for comparing the interactivity levels of the monitored objects to the stored selected levels, step 106. A special screen or window containing the high interactivity file objects which have achieved and maintained the selected interactivity levels is provided, step 107. A routine is provided for moving objects with greater than selected interactivity levels into the special display screen, step 108. Also a routine is provided as described with respect to FIGS. 5 and 6 for removing file objects from this special window where such file objects fail to maintain the selected high interactivity levels. Finally, step 109, a routine is provided for displaying this special screen of high interactivity file objects immediately in response to any file access request.

Now, with reference to FIG. 7 a simple run of a process according to the present invention will be described as would be used in combination with, for example, a Windows 95 file management system, step 111. In response to any request for file access, the initial window of high interactivity file objects, FIG. 5, would come up, step 112. The user could then use a file in the initial window or, if the file which he was seeking was not in the window, he could close the initial window and get his file routinely through the Windows 95 file manager. In either event, the user activity with respect to all object files would be monitored, step 113. During the operations, it would be continually determined, decision step 114, as to whether any file object not already in the initial window has achieved and interactivity level above set levels. If Yes, then, step 115, the file object would be put into the set of high interactivity objects in the initial window, step 115, and displayed in the window, step 116. At this point or if the decision instep 114 had been No, there would also be determined in decision step 117 whether any file objects already in the set in the initial window of high interactivity objects has dropped below set interactivity levels. If No, then the process is returned to step 113 and the monitoring of interactivity levels continued. If the decision from step 117 is Yes, that the interactivity level of a particular file object in the set has fallen below set levels, then the file object would be removed from the set and from the initial window. At this point or at any other convenient point, a determination is made, decision step 119, as to whether the session is over. If Yes, then exit, or if No, then again return to the monitoring of step 113 while user accessing of files continues.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user-interactive display operation, a system for providing user access to files stored in the operation comprising:

means for displaying on a display screen, a plurality of interactive objects, respectively representative of substantially all of the files in the operation, means for monitoring user interactivity with respect to said interactive objects, means responsive to said monitoring means for selecting a set of high interactivity objects having user interactivity greater than selected levels, and means for displaying on said display screen, said set of high interactivity objects separate from but simultaneously with said displayed plurality of objects.

2. The system of claim 1 further including user interactive means for selecting said selected levels of interactivity.

3. The system of claim 1 further including means for removing objects from said high interactivity object set if the interactivity of said objects becomes less than said selected levels.

4. The system of claim 1 wherein said plurality of files are organized in directory groups, said means for monitoring said interactive objects monitor the interactivity of objects, each respectively representing a directory group of files, said selected levels of interactivity are the interactivity levels of said objects representing directory groups of files, and whereby said objects representing directory groups of files provide said set of high interactivity objects.

5. The system of claim 3 further including means responsive to said monitoring means for dynamically adding objects to said set of high interactivity objects when said added objects have reached a user interactivity greater than said selected levels.

6. The system of claim 5 wherein said objects are icons.

7. The system of claim 5 wherein said objects comprise text.

8. A method for providing user access to files stored in a computer controlled user-interactive display operation comprising:

displaying on a display screen, a plurality of interactive objects, respectively representative of substantially all of the files in the operation, monitoring user interactivity with respect to said interactive objects, selecting a set of high interactivity objects having user interactivity greater than selected levels in response to said monitoring, and displaying on said display screen, said set of high interactivity objects separate from but simultaneously with said display of said plurality of objects.

9. The method of claim 8 further including the step of enabling the user to interactively select said object interactivity levels.

10. The method of claim 9 further including the step of removing objects from said high interactivity object set if the interactivity of said objects becomes less than said selected levels.

11. The method of claim 8 wherein said plurality of files are organized in directory groups, said monitoring of the interactive objects monitor the interactivity of objects, each respectively representing a directory group of files, said selected levels of interactivity are the interactivity levels of said objects representing directory groups of files, and whereby said objects representing directory groups of files provide said set of high interactivity objects.

12. The method of claim 10 further including the step of dynamically adding objects to said set of high interactivity objects when said added objects have reached a user interactivity greater than said selected levels.

13. The method of claim 12 wherein said objects are icons.

14. The method of claim 12 wherein said objects comprise text.

15. A computer program having program code included on a computer readable medium for providing user access to files stored in a computer controlled user-interactive display comprising:

means for displaying on a display screen, a plurality of interactive objects, respectively representative of substantially all of the files in the operation, means for monitoring user interactivity with respect to said interactive objects, means responsive to said monitoring means for selecting a set of high interactivity objects having user interactivity greater than selected levels, and means for displaying on said display screen, said set of high interactivity objects separate from but simultaneously with said displayed plurality of objects.

16. The computer of claim 15 further including user interactive means for selecting said selected levels of interactivity.

17. The computer program of claim 15 further including means for removing objects from said high interactivity object set if the interactivity of said objects becomes less than said selected levels.

18. The computer program of claim 15 wherein said plurality of files are organized in directory groups, said means for monitoring said interactive objects monitor the interactivity of objects, each respectively representing a directory group of files, said selected levels of interactivity are the interactivity levels of said objects representing directory groups of files, and whereby said objects representing directory groups of files provide said set of high interactivity objects.

19. The computer program of claim 17 further including means responsive to said monitoring means for dynamically adding objects to said set of high interactivity objects when said added objects have reached a user interactivity greater than said selected levels.

20. The computer program of claim 19 wherein said objects are icons.

21. The computer program of claim 19 wherein said objects comprise text.

* * * * *